Patented Feb. 15, 1938

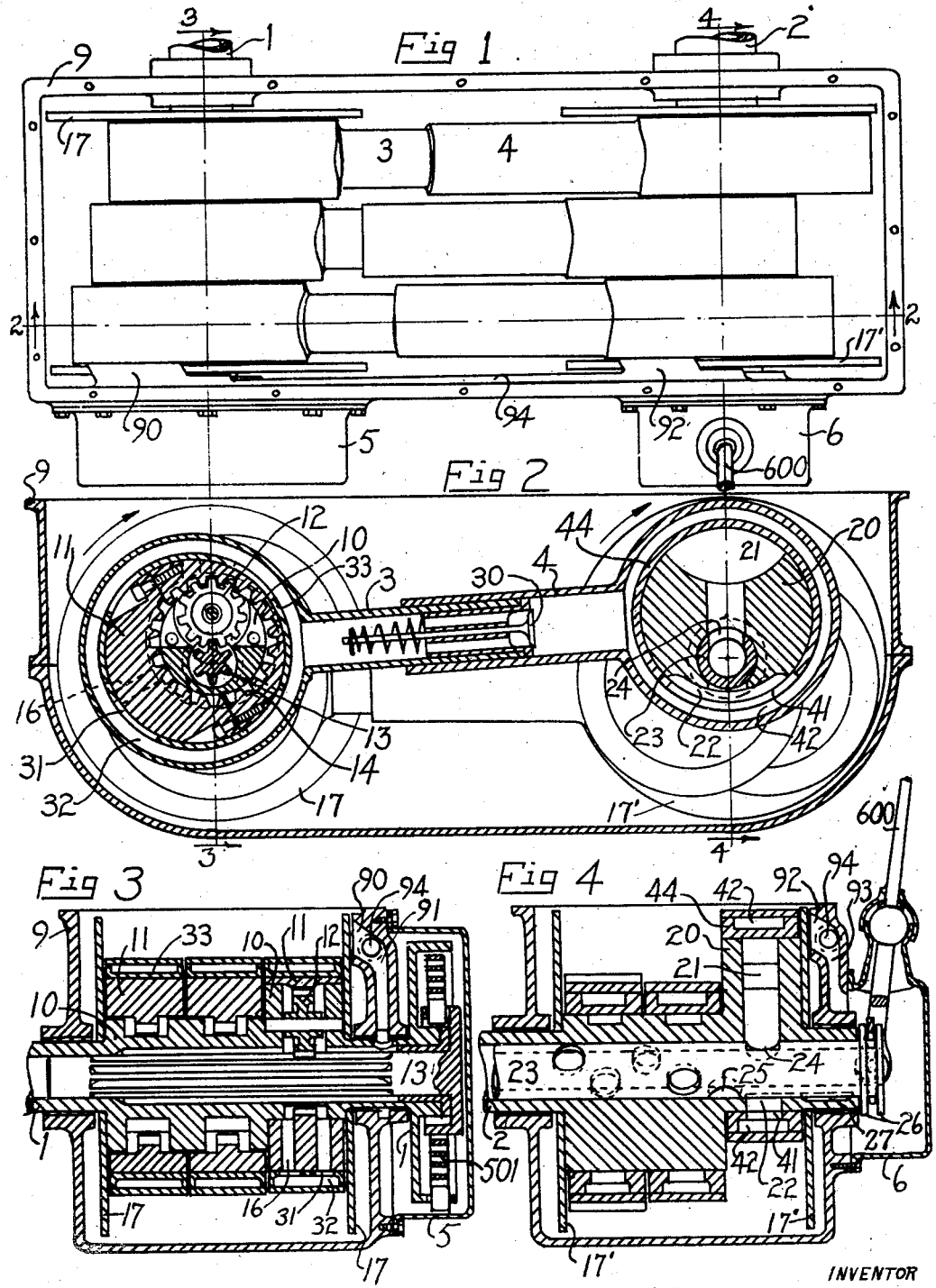

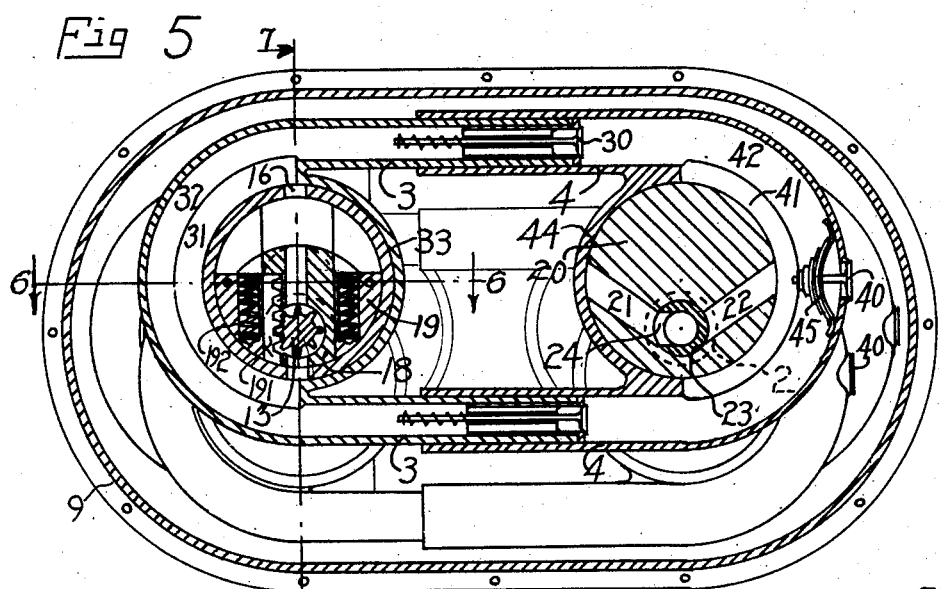
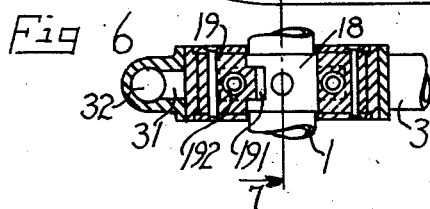
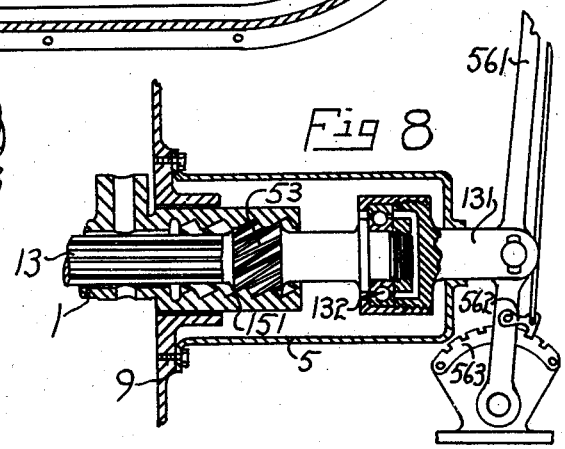
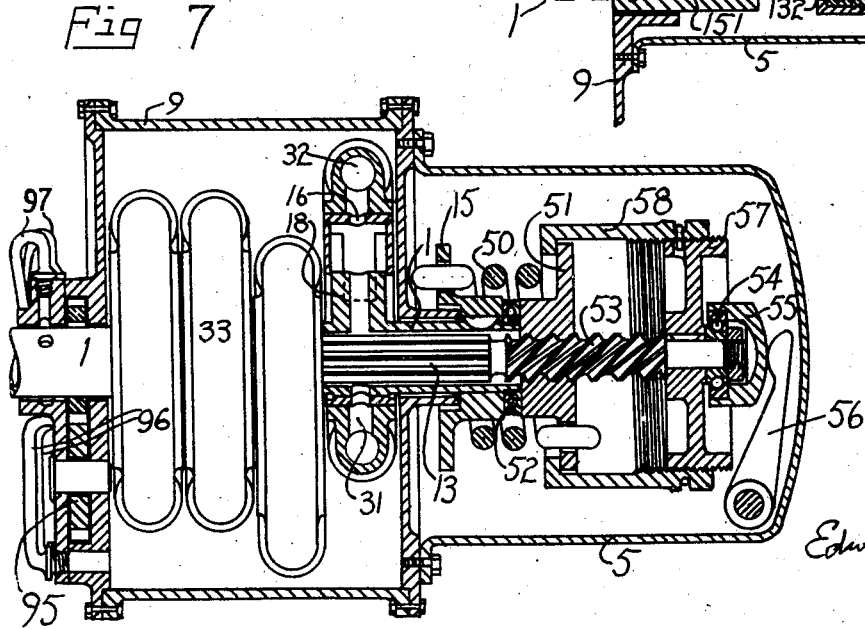

2,108,062

UNITED STATES PATENT OFFICE 2,108,062

VARIABLE TRANSMISSION

Edwin S. Hall, New Haven, Conn.

Application July 7, 1933, Serial No. 679,281

23 Claims. (Cl. 74—113)

This invention relates to variable transmissions of the sort by means of which one shaft may drive another at any speed ratio continuously variable between suitable limits, a decrease in the speed of one shaft being accompanied by a corresponding increase in its torque, relative to the other shaft, the power transmitted being substantially independent of the speed ratio.

A particular object of this invention is to provide an improved power drive for automobiles, or self-propelled vehicles, and the invention may conveniently be described from this point of view. However, the invention is applicable to many other machines, and may be used wholly or in part for any sort of machine or service as desired.

It is known that if the conventional automobile clutch and gear box were replaced by a continuously variable speed transmission, operable quietly and efficiently at any speed ratio within its range, and of such a nature that it could be maintained continually adjusted to the most suitable speed ratio for the driving conditions of the moment, many advantages would accrue, such as the following:

(1) The speed ratio of the final drive could be decreased from 4 to 1 or higher, as is now common, to 2 to 1 or lower, resulting in much slower engine speed most of the time.

(2) Fuel and oil economy could be improved considerably because the engine could operate continually at more nearly the optimum load factor than is possible with any fixed ratio gearing.

(3) Improved car performance as to acceleration, hill-climbing, and top speed, could be had without any increase in engine size, or with a smaller engine than now used.

(4) Stalling of the engine could be obviated.

(5) Driving and control of the car could be simplified.

It is an object of this invention to provide such an improved continuously variable transmission, by which these advantages may be attained.

The problem of the continuously variable speed transmission for automobiles has been approached from various directions. Most of the mechanical continuously variable transmissions which have been proposed have been ratchet drives of one form or another, making use of one-way clutches to perform the ratchet function.

Many of these ratchet drives cannot attain, or even approach, a direct 1 to 1 speed ratio. An object of this invention is to provide a variable speed transmission, using the ratchet drive principle, which may provide a continuously variable range of ratios from no drive to and including the 1 to 1 or direct drive, with the possibility of a suitable degree of overdrive if desired.

Another object of this invention is to provide a continuously variable transmission, using the ratchet drive principle, in which ratcheting may automatically cease when the speed of the driven shaft equals that of the driver. It is a further object to provide ratchet means for such a transmission which may be made fully adequate for the service involved.

Further objects of this invention are:

To provide an improved driving connection consisting of a connecting rod comprising two members axially movable relative to each other, and having ratchet means for controlling their relative movement;

To provide a continuously variable transmission, using the ratchet drive principle, comprising driving and driven shafts, one shaft having variable eccentric cranks and the other having fixed eccentric cranks, the ratcheting function being performed by the connecting means between said cranks, instead of by one-way clutches;

To provide an improved driving connection consisting of a connecting rod comprising a piston and cylinder with means for trapping fluid in said cylinder when the axial velocity of the driving end of said connecting rod overtakes the axial velocity of the driven end;

To provide a variable transmission comprising driving and driven shafts, one shaft having variable eccentric cranks and the other having fixed eccentric cranks, each variable crank being connected to one of the fixed eccentric cranks by a connecting rod comprising a piston and cylinder with means for trapping fluid in said cylinder to enable the connecting rod to transmit power from one shaft to the other;

To provide means for keeping the working parts of such a transmission full of working fluid during operation;

To provide manual, semi-automatic, or fully automatic control means by which the speed ratio of the continuously variable transmission may be varied, as desired for any service conditions in any application;

To provide an improved continuously variable transmission for an automobile which may be controlled automatically to adjust its speed ratio to suit ordinary operating conditions, with a view to maximum economy, and manually to facilitate operation of the vehicle under extraordinary conditions as when greater torque is needed for an emergency, or when the engine is not warmed up enough to run well at normal idling speed;

To provide an improved continuously variable transmission for an automobile which may operate quietly and efficiently in any speed ratio, so that operation at reduced speed ratios may be as acceptable for continuous driving as operation in direct drive;

To provide an improved transmission for an automobile having both the "free-wheeling" and the "sprag" or "no-roll-back" functions inherent in the design, without additional complication to attain either;

To provide, in a continuously variable transmission, simple and effective means by which the rotation of the driven shaft may be reversed;

To provide means by which the transmission in an automobile may permit more adequate and effective braking of the vehicle than is now possible when "using the engine for a brake";

To provide an improved transmission and the arrangements and constructions by which it may be used and controlled in automobiles, simple enough to be relatively inexpensive in production.

These and other objects may be attained by mechanism arranged and constructed as described herein in connection with the accompanying drawings, in which, Fig. 1 is a top view of a transmission constructed in accordance with the invention, the cover of the casing having been removed;

Fig. 2 is a section on the line 2—2 of Fig. 1;

Fig. 3 is a section on the line 3—3 of Figs. 1 and 2;

Fig. 4 is a section on the line 4—4 of Figs. 1 and 2;

Fig. 5 is a sectional view, similar to Fig. 2, of another embodiment of the transmission, arranged to permit the driving and driven shafts to be spaced nearer together;

Fig. 6 is a section of the variable crank assembly taken on the line 6—6 of Fig. 5;

Fig. 7 is a section looking from left to right on the line 7—7 of Figs. 5 and 6;

Fig. 8 is a section similar to Fig. 7 and showing a variation in the construction of the control mechanism;

Briefly described, the invention comprises a variable transmission and portions thereof, with controls for adjusting the speed ratio and direction of rotation of one shaft relative to the other.

In the transmission, an improved driving connection is provided consisting of a connecting rod comprising two members axially movable relative to each other, and having ratchet means for controlling their relative movement. The transmission comprises driving and driven shafts, with connecting rod members connecting them, the connecting rods having ratchet means for controlling their effective length, and means associated with one of the shafts for giving the connecting rods strokes of various lengths.

In one form of the transmission, variable eccentric cranks on one shaft are each connected to an eccentric crank on another shaft by means of a telescopic connecting rod whose telescopic action is controlled by ratchet means such that the rod cannot transmit thrust except when the axial velocity of its driving end overtakes and tries to pass the axial velocity of its driven end in the desired direction. Such a connecting rod may be constructed by using a piston and cylinder as the connecting rod, with trapped fluid such as oil as a means of transmitting thrust.

An important feature of the invention is the fact that the ratchet function is performed by the connecting rods, and not by one-way clutches on the driven shaft. As a consequence, the driven ends of the connecting rods are always correctly spaced angularly about the driven shaft axis, and the throw of the driving cranks can be increased to equal, or even exceed to some extent, that of the driven cranks, providing an efficient 1 to 1 drive, and some degree of overdrive. When the throws are equal, the ratcheting ceases automatically, the rods revolving bodily and remaining parallel to each other, in a manner well-known in the ordinary connecting rod drive between parallel shafts, yet the difficulty of the several rods bucking each other, commonly encountered, is avoided entirely.

To vary the speed ratio, the throw of the driving cranks may be adjusted in concert from zero to a maximum. Manual, automatic, and semi-automatic control means are provided, from which the most suitable may be chosen for any given application.

The rotation of the driven shaft may be reversed by changing the portions of the cycle of the driven cranks, so that each connecting rod may push during that portion in which it could not push when driving forward. Means are also provided whereby the rotation of the driven shaft may be braked or retarded, by suitable use of the reversing means.

Since the driven shaft may overrun the driver at any time, the transmission is inherently a one-way drive, and as an automobile transmission, provides both "free-wheeling" and "sprag" without the use of one-way clutches.

Referring to the drawings, the same reference characters represent the same parts of the invention thruout the several embodiments and views, and for additional clearness and convenience, reference numerals beginning with the same digit are associated with the same portion of the invention, in accordance with the following key:

1 the variable throw crankshaft assembly;
2 the fixed throw crankshaft assembly;
3 the driving end, or piston portion, of the connecting rod;
4 the driven end, or cylinder portion, of the connecting rod;
5 the speed ratio control mechanism;
6 the reverse control mechanism;
9 the transmission casing.

In the embodiment shown in Figs. 1–4, driving shaft 1 and driven shaft 2 are carried in bearings in casing 9. Shaft 1 has several eccentrics 10 on which internal eccentrics 11 are mounted so that when rotated relative to eccentrics 10, the eccentricity or throw of their exteriors relative to shaft 1 may be varied from zero to a maximum equal to the sum of the eccentricities of eccentrics 10 and 11. Each of the eccentrics 11 is made somewhat unbalanced at zero position so that its tendency when rotating is always to increase the crank throw by centrifugal action.

To insure the concerted action of the several cranks when their eccentricity or throw is varied, each internal eccentric 11 has an internal gear 14 in mesh with idler 12 carried in eccentric 10 and meshing with pinion shaft 13 which is coaxial with and carried inside hollow shaft 1. When pinion shaft 13 turns relative to shaft 1, the throw of all eccentrics 11 relative to shaft 1 is varied in concert. This movement is influenced by torsional spring 501 which connects a flange on pinion shaft 13 with a flange on shaft 1, and tends to reduce the crank throw to zero, in which position the parts are shown in Fig. 3.

Surrounding each eccentric 11 is the strap portion 33 of piston member 3. Piston 3 is provided with automatic or check valve 30 to control the flow of fluid thru piston 3 into cylinder 4. Piston 3 together with cylinder 4 constitute the connecting rod. Strap portion 44 of cylinder member 4 surrounds eccentric 20 which is integral with shaft 2.

Automatic valve 30 could be associated with cylinder member 4 if preferred, it being essential only that it function as a check valve to admit fluid to cylinder 4 while automatically closing to prevent fluid from leaving cylinder 4. The position of automatic valve 30 in piston 3 as shown, is preferred because the inertia of valve 30 in connection with the movements of piston 3 will assist in opening and closing valve 30 at the proper points in the cycle, thereby promoting free flow thru the valve and the proper functioning thereof.

Shaft 2 is also a hollow shaft, and inside it, tubular valve 23 is axially slidable, but restrained from rotation relative to shaft 2 by suitable keys or splines as for example, key 27. Tubular valve 23 has a pair of ports 24 and 25 for each of eccentrics 20, and may be moved axially by means such as flanges 26 and lever 600.

Discs 17 are fixed on shaft 1 and serve to keep strap portions 33 of piston members 3 in position on eccentrics 11, and also serve as oil slingers to throw oil, which may be of suitable depth in casing 9, into scoop 90 from which it may flow thru channel 91 into hollow shaft 1, thence axially in the space between the teeth of pinion shaft 13, and thru channels 16 in eccentrics 11, thru ports 31 and channel 32 into piston 3.

Similar discs 17' are fixed on shaft 2, and throw oil into scoop 92 from which it may flow thru channel 93 into housing 6 and into hollow valve 23, thence thru one of the ports 24 and 25, to the respective one of the ports 21 and 22 in eccentric 20. During part of the cycle, each of these ports communicates with channel 42 thru port 41 in strap portion 44 of cylinder member 4.

Oil is the preferred working fluid and to insure operation of the mechanism, all the working parts must be maintained full of oil. The oil also serves to lubricate the working parts. Since it leaks out between various working surfaces, a sufficient supply must be continually supplied to both hollow shafts 1 and 2, but it is not necessary to maintain a high pressure on the oil. When one shaft is not running, oil must be supplied to it by the operation of the other shaft. For this purpose, bypass 94 connects scoop 90 with scoop 92.

The operation of the transmission will be more readily understood if it is realized at once that it is not a hydraulic transmission, as the term is commonly understood. The working fluid is not displaced from one expansible chamber into another, but serves as a convenient means for providing the ratchet function of the connecting rods.

In operation, shaft 1 may be running slowly with shaft 2 at rest, the throw of eccentrics 11 being held at zero by the action of spring 501, which by tending to turn pinion shaft 13 relative to shaft 1, acts thru idler gear 12 and internal gear 14 to resist any increase in crank throw of eccentrics 11.

If now the speed of shaft 1 be increased, centrifugal action due to the unbalanced state of eccentrics 11, will overcome the effect of spring 501 and the crank throw will be increased, imparting stroke to the connecting rods. The amount of crank throw, in the case of the embodiment illustrated in Figs. 1–4, will depend on the balance between the action of centrifugal force which tends to increase the crank throw, and the action of spring 501 tending to decrease the crank throw. The driving resistance of shaft 2, expressed thru eccentrics 20 and the connecting rods, may also tend to decrease the crank throw.

In Fig. 2 the crank throw is shown at one-half maximum, and with rotation as indicated by the arrows, piston 3 is being driven to the right. With cylinder 4 full of oil, valve 30 is closed, and the oil has no place to go. Port 41 is open into port 22, but port 22 is closed by valve 23. The trapped oil will therefore carry the thrust of piston 3 thru cylinder member 4 to eccentric 20 to turn shaft 2. Since the crank throw of eccentric 11 is one-half that of eccentric 20, the angular speed of shaft 1 will be twice that of shaft 2 during this driving impulse. For the same reason, a half-turn of eccentric 11 would drive eccentric 20 only one-quarter-turn forward. Then eccentric 11 would be past center and piston 3 would be on the return stroke, being pulled outwardly from cylinder 4. Port 41 being still closed, automatic valve 30 opens to permit oil to flow into cylinder 4 from piston 3. On the next forward stroke of piston 3, oil is again trapped in cylinder 4, and further motion imparted to eccentric 20.

When eccentric 20 approaches its outward center, port 21 begins to register with port 41, so that the interior of cylinder 4 and strap portion 44 is in free communication with the interior of valve 23, and the oil may "breathe" freely in and out as required by the relative movement of piston 3 and cylinder 4. This condition holds until eccentric 20 has turned somewhat more than half a revolution, until it has reached and passed its inward center, the drive in the meantime being continued by one or more of the other connecting rod units. When driven crank 20 is on either "dead center" relative to the connecting rod, the rod can transmit no thrust, and when driven crank 20 is turning toward piston 3, so that the thrust of piston 3 would drive it in the wrong direction, the rod can transmit no thrust, because oil may flow freely to and from cylinder 4 thru ports 41, 21, and 24, and sleeve 23.

The action of tubular valve 23 in reversing the drive will now be understood. If lever 600 is thrown over so that port 24 no longer registers with port 21, but port 25 registers with port 22, the free "breathing" action may take place when eccentric 20 is "up" as shown in Fig. 2, but when eccentric 20 is "down", oil would be trapped, and the thrust of piston 3 would drive driven shaft 2 in the reverse direction of rotation.

For a given position of valve 23, the portion of the cycle of crank 20 during which the connecting rod may transmit a driving impulse is controlled by the relative position of crank 20 and the connecting rod, but the moment at which an impulse will occur, and the duration of that impulse, is not predetermined by that relative position or by any other means. During any stroke, a driving impulse starts whenever the axial velocity of the driving end of the connecting rod overtakes that of the driven end moving in the desired direction, and continues until the axial velocity of the driven end exceeds that of the driving end. The start and duration of the driving impulse have no fixed angular relation to crank 20, but are dependent on the free interaction of various conditions such as the relative speed of the two shafts, and the relative throws and angular positions of the two cranks.

The speed ratio of the drive is determined by the crank throw of variable eccentrics 11 relative to the throw of eccentrics 20. If the throw of eccentrics 11 be permitted to increase to a value greater than the throw of eccentrics 20, "overdrive" would result. During forward drive, when the crank throw of eccentrics 11 becomes equal to that of eccentrics 20, there will be substantially no further relative movement between piston 3 and cylinder 4, except what may be necessary to make up for leakage. Thus when the 1 to 1 speed ratio has been reached, ratcheting ceases automatically, and the connecting rods revolve bodily, remaining parallel with each other as in the ordinary connecting rod drive between parallel shafts, but obviously no possibility of "bucking" exists because each connecting rod can carry one-way drive only.

Driven shaft 2 may overrun shaft 1 freely, port 41 and associated ports being open to let oil out when each cylinder 4 is approaching piston 3, automatic valve 30 opening when required to let oil into cylinder 4 when moving away from piston 3. Moreover, when shaft 1 is stopped, or when for any reason the crank throw of eccentrics 11 is zero, shaft 2 may turn freely in the forward direction, but is locked against reverse rotation by the oil trapped in cylinder 4.

If valve 23 is in position for reverse drive, shaft 2 may be driven backward by shaft 1, and may overrun the driving action of shaft 1, and when the crank throw of eccentrics 11 is zero, shaft 2 may turn freely in reverse rotation, but is locked against forward rotation.

Because of the foregoing characteristics, when the transmission is used in an automobile, both "free-wheeling" and "sprag" or "no-roll-back" are available in all speeds forward and reverse, without any additional complication and without the use of any one-way clutches. It follows that in order "to use the engine as a brake", valve 23 would have to be moved into reverse position and the crank throw of eccentrics 11 maintained appreciably greater than zero. The latter condition is not conveniently met, because the control means would normally return the crank throw of eccentrics 11 to zero at idling speed of the engine. It is considered advisable, therefore, not to use the engine as a friction device when using this improved transmission. From the standpoint of engine life, this is a decided advantage, and since superior braking ability is available in the transmission itself, there is no practical objection to dispensing with the makeshift practice of "braking with the engine".

The desired braking action may be had by moving valve 23 toward reverse position, by means of lever 600, while permitting the engine to idle thereby reducing the throw of eccentrics 11 to zero. When in neutral, both ports 24 and 25 may be open part way, and as reverse position is approached, ports 24 are more and more closed, throttling the flow of oil caused by the pumping action of cylinders 4 relative to pistons 3, producing adequate and effective braking. Owing to unavoidable leakage, it would not be possible to absolutely lock the wheels for a period of time in this manner; the braking action is due to the motion of the vehicle itself producing motion of the driving wheels, and the faster they turn, the greater the available braking action.

While the oil acquires considerable heat when the transmission is being used for braking, very little heat is developed under ordinary driving conditions. The efficiency of the transmission when transmitting power is high, and is very nearly as high when at reduced speed as at the 1 to 1 ratio, so that operation when at reduced speed is as quiet and acceptable as that at direct drive. No oil is pumped from one place to another under high pressure when driving; the high pressure existing on the oil trapped in cylinder 4 during the driving impulse is momentary, and is relieved before the ports open, so that the high fluid friction losses characteristic of hydraulic transmissions are avoided. While the drive is transmitted by impulses, the rapidity with which the impulses occur and the cushioning effect of the oil make for extremely smooth and quiet operation at any speed ratio.

The reduced speed ratios are attained by the ratchet drive principle, using a piston, cylinder, and automatic valve, with trapped oil, as a ratchet.

The embodiment shown in Figs. 5–8 is of somewhat different construction, but operates on the same principles. The distance between shafts 1 and 2 has been shortened without shortening the maximum crank throw, by offsetting pistons 3 and cylinders 4, using a pair of each in each connecting rod unit. This construction may also be advantageous in providing a freer flow of the working fluid, and in permitting narrower units with the same piston area, thus shortening the length of shafts 1 and 2 between bearings. Four driving units are shown, as compared with three in Figs. 1–4. Any number may be used as desired. For continuous drive at the 1 to 1 speed ratio, at least three must be used. To avoid rocking couples, the number should be doubled, as in balancing engines.

The connecting rods shown in Figs. 2 and 5 are both single-acting, altho the construction shown in Fig. 5 uses a pair of pistons 3 and cylinders 4 for each connecting rod. The crank throw of the variable cranks shown in Fig. 5 is at the maximum, equal in extent to that of the throw of eccentrics 20 on shaft 2, so that all the connecting rods are parallel and remain so during operation, as long as the 1 to 1 speed ratio is maintained.

The construction of the variable cranks shown in Figs. 5–7 is somewhat different from that illustrated in Figs. 1–4. Shaft 1 is provided with flattened portions 18 each engaging eccentric assembly 19 having rack 191 which engages pinion shaft 13. Return springs 192 may be provided to resist the action of centrifugal force, as shown in Fig. 5.

The action of these return springs 192 is supplemented by that of torsional spring 50, shown in Fig. 7. One end of spring 50 engages flange 15 which is fixed on shaft 1. The other end of spring 50 engages collar 51 which is mounted on helical splines 53 on pinion shaft 13, which also carries thrust bearing 54 and cap 55 for engagement with control lever 56. When lever 56 is operated, pinion shaft 13 is moved axially. Axial movement of collar 51 is prevented by the abutting bearing 52, so that collar 51 is rotated relative to pinion shaft 13 so as to wind up torsion spring 50 to produce more tension in it tending more strongly toward a smaller crank throw for eccentrics 19. When lever 56 is retracted so as not to bear on cap 55, the tension of spring 50 may be adjusted by screwing sleeve nut 58 relative to flange 57 which is fixed on shaft 13; thus adjusting the position of shaft 13 by changing the point at which the inward lip of sleeve 58 engages collar 51. This adjustment, if the transmission were applied to an automobile engine, would serve to adjust the idling speed at which spring 50 would hold the crank throw of eccentric assemblies 19 at zero.

The control mechanism shown in Fig. 8 is similar to that of Fig. 7 but adjustment of the axial position of shaft 13 is made manually by means of lever 561 having pawl 562 engaging notched quadrant 563. Lever 561 is pinned to pinion shaft extension 131, which is attached to pinion shaft 13 by means of the two-way thrust bearing 132. When pinion shaft 13 is moved axially relative to shaft 1, by lever 561 and associated parts, the engagement of helical splines 53 of shaft 13 with the internal helical splines 151 of shaft 1, causes rotation of pinion shaft 13 relative to shaft 1, to adjust the crank throw of eccentric assemblies 19, thru the engagement of pinion shaft 13 with racks 191.

The reversing mechanism of the embodiment shown in Figs. 5–8 is similar to that of Figs. 1–4, differing only in minor details as to position and construction of ports 21, 22, and 41.

For supplying oil to shafts 1 and 2, instead of oil slingers and scoops, positive pumping means are provided consisting of twin gear pumps 95 and supply conduits 96 and discharge conduits 97. In Fig. 7, one of pumps 95 is shown in section, the other on shaft 2 being identical in structure and situated immediately behind it in this projected view. These pumps take oil thru supply conduits 96 from casing 9 and deliver it into shafts 1 and 2 thru discharge conduits 97.

To prevent overloading, safety valves 40 may be provided, held to their seats by springs 45 which may be adjusted to permit valves 40 to open if the pressure in cylinder members 4 should become excessive. When the transmission is used in vehicles, valves 40 might be set to open just before the driving wheels of the vehicle would start to slip, so that spinning of the wheels, or skidding, might be avoided.

From the foregoing description of the embodiment and control means shown in Figs. 5–8, the operation will be readily understood, since the operation of the transmission is similar to that which has already been described in connection with Figs. 1–4.

The choice of control method for the speed ratio of a continuously variable transmission depends upon the service requirements. The manual control illustrated in Fig. 8 may be suitable in some cases, but usually an automatic or semi-automatic control is desirable. For automobiles, the speed ratio should be maintained automatically at that which will promote maximum economy, but when maximum power or acceleration is desired, manual control means should be available by which the operator can modify the automatic control to alter the speed ratio to that which will permit the engine to deliver maximum power.

The control illustrated in Fig. 7 may approximately meet these conditions, the centrifugal forces in the variable crank assembly serving as a centrifugal governor to increase the crank throw as the speed of driving shaft 1 increases, resisted by the resistance of driven shaft 2 and the influence of return spring 50. When more power is desired, the operator may move control lever 56 to wind up spring 50, increasing its tension, thereby decreasing the crank throw and permitting the engine speed to increase for more power. This control would also be of assistance when starting a cold engine. By increasing the tension of spring 50, the crank throw can be held at zero with the engine speed higher than normal idling speed until the engine is warmed up sufficiently to idle normally.

Lever 56 may be moved directly by the operator, or any sort of "servo" mechanism may be employed to increase the tension of spring 50, power for the "servo" mechanism being obtained in any well known and suitable manner from an engine driven oil pump, or from the intake manifold of the engine of the automobile.

From the foregoing, together with the drawings, it will be obvious that means have been provided whereby all the objects of the invention outlined in this specification may be attained, together with all the advantages enumerated. While particular embodiments have been shown and described, it will be understood that changes in the arrangement and construction of the various parts may be made without departing from the spirit or scope of the invention as expressed in the following claims.

I claim:

1. Means for transmitting power between spaced parallel shafts comprising a series of units each including a connecting rod comprising a piston and cylinder, a crank on each of said shafts and for each unit and operably connected to said connecting rod, and valve means associated with one of said cranks for controlling the flow of fluid into and out of said cylinders, and a check valve operably associated with each cylinder to permit fluid to flow into but not out of said cylinder.

2. A power transmission comprising driving and driven shafts, connecting means between said shafts consisting of a series of units each comprising a crank on each of said shafts the throw of one of said cranks being variable, a connecting rod operably connecting said cranks, said connecting rod comprising two members axially movable relative to each other, and means for controlling the axial movement between the members of said connecting rod.

3. In a power transmission, driving and driven members, a plurality of units connecting said members each of said units comprising a crank on each of said members, and a connecting rod operably connecting said cranks and comprising two members axially movable relative to each other, and ratchet means for controlling the axial movement between the members of said connecting rods; and means for altering the action of said ratchet means to reverse the rotation of the driven member of said transmission.

4. In a power transmission comprising parallel driving and driven members, a series of connecting units between said members, ratchet means associated with said connecting units to control the effective lengths thereof, and means associated with said driving member for giving said connecting units strokes of various lengths.

5. A power transmission comprising driving and driven shafts, a series of cranks on each of said shafts the throws of one of said series being variable, a series of connecting rods operably connecting said cranks, each of said connecting rods comprising a piston member having a plurality of pistons and a cylinder member having a plurality of cylinders coacting with said pistons.

6. In a power transmission comprising driving and driven members, the same number of cranks on each of said members, the crank throw of those cranks on one of said members being variable, and connecting rods operably connecting the two sets of cranks, each connecting rod comprising two members axially movable relative to each other, means for controlling concertedly the crank throw of said variable cranks.

7. Means for transmitting power between parallel shafts comprising, in combination with said shafts, a plurality of driving connections each including a connecting rod comprising a hollow piston and a cylinder, and an automatic valve in said piston operable to control the flow of fluid from within said piston into said cylinder, said valve opening and closing in harmony with the inertia forces resulting from the motion of said piston.

8. In combination, a series of driving connections between two parallel shafts, each connection including a connecting rod comprising a piston and cylinder, a crank on each of said shafts and for each connection and operably connected to said connecting rod, and valve means associated with one of said cranks for controlling the flow of fluid into and out of said cylinders.

9. In combination, a series of driving connections between two parallel shafts, each connection including a connecting rod comprising a piston and cylinder, a crank on each of said shafts and for each connection and operably connected to said connecting rod, valve means associated with one of said cranks for controlling the flow of fluid into and out of said cylinders, and a check valve operable by fluid pressure to permit fluid to flow into but not out of said cylinder.

10. Means for transmitting power comprising parallel driving and driven shafts, connecting means between said shafts and comprising a series of telescopic connecting rods, and ratchet means in each of said rods for controlling the relative movements of the telescopic parts thereof, said ratchet means comprising in combination a piston and cylinder and a check valve associated with said piston and responsive to said relative movements.

11. Means for transmitting power comprising parallel driving and driven shafts, connecting means between said shafts and comprising a series of telescopic connecting rods, ratchet means in each of said rods for controlling the telescopic action thereof and comprising a hollow piston and a cylinder and a check valve in said hollow piston, and means for maintaining said hollow piston and cylinder full of working fluid during operation.

12. A power transmission comprising parallel driving and driven shafts, a series of connecting units between said shafts each unit comprising a crank on each of said shafts the throw of one of said cranks being variable, a connecting rod operably connecting said cranks, said connecting rod comprising two members axially movable relative to each other, ratchet means for controlling the axial movement between the members of said connecting rod, said ratchet means comprising a piston and cylinder and an automatic valve operable to permit fluid to flow into but not out of said cylinder.

13. A power transmission comprising parallel driving and driven shafts, a series of connecting units between said shafts each unit comprising a crank on each of said shafts the throw of one of said cranks being variable, a connecting rod operably connecting said cranks, said connecting rod comprising two members axially movable relative to each other, ratchet means for controlling the axial movement between the members of said connecting rod, said ratchet means comprising a piston and cylinder and an automatic valve operable to permit fluid to flow into but not out of said cylinder, and positively operated valve means for controlling flow of fluid into and out of said cylinder.

14. A power transmission comprising parallel driving and driven shafts, a series of connecting units between said shafts each unit comprising a crank on each of said shafts the throw of one of said cranks being variable, a connecting rod operably connecting said cranks, said connecting rod comprising two members axially movable relative to each other, ratchet means for controlling the axial movement between the members of said connecting rod, said ratchet means comprising a piston and cylinder and a check valve operable to permit fluid to flow into but not out of said cylinder, and an automatic valve operable to permit fluid to flow out of but not into said cylinder to relieve excess pressure therein.

15. A power transmission comprising parallel driving and driven shafts, a series of connecting units between said shafts each unit comprising a crank on each of said shafts the throw of one of said cranks being variable, a connecting rod operably connecting said cranks, said connecting rod comprising two members axially movable relative to each other, ratchet means for controlling the axial movement between the members of said connecting rod, said ratchet means comprising in combination a piston and cylinder and a check valve associated therewith; and means for maintaining both said shafts and said connecting units full of working fluid such as oil by the operation of either of said shafts.

16. In a power transmission, driving and driven members, a series of connecting units between said members each unit comprising a crank on each of said members, and a connecting rod operably connecting said cranks and comprising a piston and cylinder in which fluid may be trapped during a portion of the cycle of the driven member; and means comprising a tubular valve coaxial with said driven member for changing the portion of the cycle of the driven member during which fluid can be trapped in said cylinder to reverse the rotation of the driven member.

17. In a power transmission, driving and driven members, a series of connecting units between said members each unit comprising a crank on each of said members one of said cranks being variable, and a connecting rod operably connecting said cranks and comprising a piston and cylinder in which fluid may be trapped during a portion of the cycle of the driven member; and valve means associated with the driven member for changing the portion of the cycle of the driven member during which fluid can be trapped in said cylinder to reverse the rotation of the driven member relative to that of the driving member.

18. A power transmission comprising parallel driving and driven shafts, a series of connecting units between said shafts each unit comprising a crank on each of said shafts the throw of one of said cranks being variable, a connecting rod operably connecting said cranks and comprising a piston member having a plurality of pistons and a cylinder member having a plurality of cylinders coacting with said pistons, check valve means associated with said piston member, and positively operated valve means associated with said cylinder member.

19. A power transmission comprising parallel driving and driven shafts, a series of connecting units between said shafts each unit comprising a crank on each of said shafts the throw of one of said cranks being variable, a connecting rod operably connecting said cranks and comprising a piston member having a plurality of pistons and a cylinder member having a plurality of cylinders coacting with said pistons, said cylinder member having an automatic relief valve for relieving excessive pressure therein.

20. A power transmission comprising driving and driven shafts, a series of connecting units between said members each unit comprising a crank on each of said shafts the throw of one of said cranks being variable and the other fixed, a connecting rod operably connecting said cranks and comprising a piston member having a pair of pistons and a cylinder member having a pair of cylinders coacting with said pistons, check valve means permitting fluid to flow into said cylinders, and positively operated valve means permitting fluid to flow in or out of said cylinders during a portion of the cycle of said driven shaft; and tubular valve means associated with said driven shaft for changing the portion of the cycle thereof during which fluid can flow in or out of said cylinders to reverse the direction of rotation of said driven shaft.

21. A power transmission comprising parallel driving and driven members, a series of connecting units between said members each unit comprising a crank on each of said members the throw of one of said cranks being variable, a connecting rod operably connecting said cranks and comprising two members axially movable relative to each other, ratchet means for controlling said connecting rod members, and means for controlling the crank throw of said variable crank.

22. A power transmission comprising parallel driving and driven members, a series of connecting units between said members each unit comprising a crank on each of said members the throw of one of said cranks being variable, a connecting rod operably connecting said cranks and comprising two members axially movable relative to each other and ratchet means for controlling the relative axial movement of said connecting rod members; and manually operable means for controlling the crank throws of said variable cranks.

23. A power transmission comprising driving and driven members, a series of connecting units between said members each unit comprising a crank on each of said members the throw of one of said cranks being variable, a connecting rod operably connecting said cranks and comprising two members axially movable relative to each other; and ratchet means for controlling the relative axial movement of said connecting rod members and speed responsive means for controlling the crank throws of said variable cranks.

EDWIN S. HALL.